US010532315B1

(12) United States Patent
Campbell et al.

(10) Patent No.: US 10,532,315 B1
(45) Date of Patent: Jan. 14, 2020

(54) SYSTEM FOR FLAMELESS CATALYTIC DESTRUCTION OF FUGITIVE ORGANICS AND PRODUCING ENVIRONMENTALLY CLEAN HOT GAS FOR OTHER USES OF THERMAL ENERGY

(71) Applicant: ADVANCED CATALYST SYSTEMS LLC, Maryville, TN (US)

(72) Inventors: Larry E. Campbell, Maryville, TN (US); Shujian Chen, Knoxville, TN (US)

(73) Assignee: Advanced Catalyst Systems LLC, Maryville, TN (US)

(*) Notice: Subject to any disclaimer, the term of this patent is extended or adjusted under 35 U.S.C. 154(b) by 0 days.

(21) Appl. No.: 16/352,178

(22) Filed: Mar. 13, 2019

Related U.S. Application Data

(63) Continuation-in-part of application No. 15/245,125, filed on Aug. 23, 2016, now abandoned.

(60) Provisional application No. 62/210,846, filed on Aug. 27, 2015.

(51) Int. Cl.
| B01D 53/86 | (2006.01) |
| B01D 53/88 | (2006.01) |
| B01J 35/04 | (2006.01) |
| B01J 33/00 | (2006.01) |
| B01J 23/42 | (2006.01) |
| B01J 23/46 | (2006.01) |
| B01J 23/44 | (2006.01) |

(52) U.S. Cl.
CPC ..... *B01D 53/8668* (2013.01); *B01D 53/8696* (2013.01); *B01D 53/885* (2013.01); *B01J 23/42* (2013.01); *B01J 23/44* (2013.01); *B01J 23/464* (2013.01); *B01J 33/00* (2013.01); *B01J 35/04* (2013.01); *B01D 2255/1021* (2013.01); *B01D 2255/1023* (2013.01); *B01D 2255/1025* (2013.01); *B01D 2257/7025* (2013.01); *B01D 2257/7027* (2013.01)

(58) Field of Classification Search
None
See application file for complete search history.

(56) References Cited

U.S. PATENT DOCUMENTS

| 3,930,790 A * | 1/1976 | Rogosch ................ B65B 53/02 432/229 |
| 3,930,970 A | 1/1976 | Barton |
| 4,177,168 A | 12/1979 | Denny et al. |
| 6,045,355 A | 4/2000 | Chapman et al. |
| 6,231,334 B1 | 5/2001 | Bussman et al. |
| 6,712,601 B2 | 3/2004 | Cessac |
| 6,933,593 B2 | 8/2005 | Fissore et al. |
| 8,550,812 B2 | 10/2013 | Moneyhun et al. |
| 2011/0123940 A1 | 5/2011 | Szynkarczuk et al. |
| 2015/0128443 A1 | 5/2015 | Madden |

* cited by examiner

Primary Examiner — Walter D. Griffin
Assistant Examiner — Jelitza M Perez
(74) Attorney, Agent, or Firm — Robinson IP Law, PLLC

(57) ABSTRACT

A system for flameless catalytic destruction of fugitive hydrocarbons which preferably includes multiple catalytic heaters placed face to face in an array and spaced such that an optional infrared absorber may be placed between the face to face heaters. The heater, absorber and air are preferably held in equilibrium and keep the heater surface below the ignition temperature of any hydrocarbon which might be present in the drafted air.

31 Claims, 10 Drawing Sheets

SYSTEM FOR FLAMELESS CATALYTIC DESTRUCTION OF FUGITIVE ORGANICS AND PRODUCING ENVIRONMENTALLY CLEAN HOT GAS FOR OTHER USES OF THERMAL ENERGY

CROSS-REFERENCE(S) TO RELATED APPLICATION(S)

This application is a continuation-in-part (CIP) application claiming priority to pending U.S. patent application Ser. No. 15/245,125 entitled "System for Flameless Catalytic Destruction of Fugitive Organics" which was filed on Aug. 23, 2016 which claims priority to U.S. Provisional Patent Application No. 62/210,846 which was filed on Aug. 27, 2015, the entireties of which are incorporated herein by reference.

FIELD

This disclosure relates to the field of the destruction of fugitive gases in industrial environments.

BACKGROUND

A gas flare in the industry such as petroleum refineries, natural gas processing (natural gas fracking) plants as well as natural gas drilling stations raises a significant public health concern. Formation of black smoke from incompletely combusted hydrocarbon compounds and other mixes including known carcinogens such as BTEX (benzene, toluene, ethyl-benzene and xylene) become major pollutants threatening our living environment. A flame is also another major concern in the plants when the gases are ambient because of possible explosion.

As an example, the process for removing water from fracked natural gas uses a liquid desiccant (ethylene glycol derivatives). The desiccant is contacted with wet natural gas and it removes the water from the natural gas until it is saturated. The water saturated liquid desiccant is heated to separate the water vapors and the desiccant liquid. The dry desiccant is recycled and the steam is condensed. The fugitive gases from the water condensation contain primarily methane with trace amounts of Benzene, Toluene, Ethyl benzene and Xylene which must be destroyed. Conventionally these gases are vented or burned in a flame-flare as described above. Because the flare produces oxides of nitrogen, they are under scrutiny by the EPA.

What is needed, therefore, is an apparatus and method for destroying methane and entrained BTEX contaminates, and to more fully combust hydrocarbon compounds in industrial environments with no flame.

SUMMARY

The present general inventive concept relates generally to a system for flameless catalytic destruction of fugitive organics such as hydrocarbons. The system described herein comprises multiple catalytic heaters placed face to face in an array and spaced such that an infrared absorber may be placed between the face to face heaters in such a way that they absorb the infrared heat produced by catalysts on either side and can then release some of the heat to the air produced by a thermal draft and some of the heat in the form of broad band infrared is reflected back to the heater surface. The heater, absorber and air are in equilibrium and keep the heater surface below the ignition temperature of any hydrocarbon which might be present in the drafted air. The catalytic heaters are maintained at steady state by introducing a gaseous fuel through two orifices one on each side of the face to face array of heaters. The fuel is generally natural gas, propane or butane and is delivered at elevated pressure through the calibrated orifice to deliver between 2,000 to 5,000 BTU per hour per square foot of catalytic heater. The fuel gas has a higher pressure than ambient and is delivered equally to each of the heaters by controlling the flow resistance with a special manifold. Depending on the density of the fuel being used, such fuel can either be delivered into the bottom of each heater (if the density of the fuel is less than that of air) or the top of each heater (if the density of the fuel is greater than that of air). The fugitive hydrocarbons are introduced through a separate pipe and split in half at a "T" junction where it is mixed with the fuel gas on each side of the array of heaters and delivered equally to each of the heaters.

The device is ignited by introducing fuel gas mixed with hydrogen or methanol vapors through the array of heaters. The catalyst will combust the hydrogen or methanol vapors at room temperature. (The device can also be ignited by more conventional methods such as an embedded heater or by an external flame or spark). Once the temperature is sufficiently high so that the fuel gas is ignited the hydrogen or methanol vapors are discontinued and the device is operating in steady state mode and is ready to accept the fugitive hydrocarbons. This device operated in this way can achieve greater than 95% destruction of fuel and fugitive hydrocarbons including, for example, Benzene, Ethyl Benzene, Toluene and Xylene without formation of Nitrogen Oxides, soot or ignition points, thus making the device a safe and environmentally friendly system. The hot drafted air may contain small amounts of carbon monoxide which is destroyed by allowing the drafted air to pass through a large cell honeycomb catalyst array placed at the exhaust outlet of the system. For example, for the example process described above of removing water from fracked natural gas using a liquid desiccant (ethylene glycol derivatives), the hot clean gas exhaust can be used to heat the ethylene glycol to strip out the water thus gaining credit for the pilot fuel gas and the heat of combustion of the fugitive gas. The device may also be utilized for the removal of chlorinated organic compounds. The honeycomb catalyst typically contains one or more of a group of precious metals such as platinum, palladium, and rhodium. In some embodiments, the honeycomb catalyst also includes an optional washcoat over a ceramic or metal substrate. The washcoat can be any suitable refractory material, including, as some examples, alumina, silica, ceria, or zirconia. In certain optimal embodiments, the honeycomb catalyst contains between 2-60 $g/ft^3$ of precious metal with a washcoat over a ceramic or metal substrate having between 10 to 400 cpsi.

A preliminary study indicated that a single non-faced catalytic heater can help reduce those pollutants due to their oxidation on the catalytic layer becoming carbon dioxide and water mostly. However, the combustion efficiency decreases when a large quantity of the gases is passing through the heater. To find a solution these problems, it was unexpectedly determined that using face to face pairs of heaters to create a catalytic heater system increases combustion efficiency ≥95% when more gases are brought to the catalytic heaters. The whole combustion is flameless when the quantity of the gases is below a concern value. Due to variable quantity of the fugitive gas, a feed gas is needed to keep the catalytic heaters hot so that high combustion efficiency can be retained.

The catalytic heaters may be of different shapes, such as square or rectangular. Optimally, the pairs of heaters within a given system should be of similar shape and size, thus pairs or squares or rectangles. With rectangular pairs, so long as the pairs are oriented similarly throughout, the heaters may be oriented with the long side parallel to the ground, or, alternatively, with the long side perpendicular to the ground. In some optimal systems, the heaters are between 6 and 20 inches in width and between 18 and 36 inches in length. Typically, an individual system contains catalytic heaters in pairs of identical shape, size, and composition throughout. The number of catalytic heater pairs can be changed to accommodate a desired increase in fugitive gas flow rate. For example, if the desired rate is 2 scfm (standard cubic feet per minute), 9 pairs of appropriately sized catalytic heaters may be utilized: if the desired rate is 4 scfm, 18 pairs would be utilized, and so forth, with each additional +2 scfm requiring an additional array of 9 additional pairs of catalytic heaters.

There is zero NOx formed in the system described herein. If CO is another concern about emission, a second array of honeycomb catalyst can be used. Most CO from uncompleted combustion is oxidized when the exhaust passes through this catalyst.

In a preferred embodiment, a system for destroying fugitive organic vapor emissions is disclosed which comprises at least two catalytic flameless heater combustors, the first of said at least-two catalytic flameless heater combustors having a front, a back, a top, and a bottom, the second of said at least two catalytic flameless heater combustors having a front, a back, a top, and a bottom, said at least two catalytic flameless heater combustors being removeably affixed so as to have said front of said first of said at least two catalytic flameless heater combustors facing said front of said second of said at least two catalytic flameless heater combustors at a distance ranging from about 1 inch to about 12 inches. The system preferably includes at least one manifold for feeding gases into said at least two catalytic flameless heater combustors. In one embodiment, the system further comprising a heat absorber inserted between said front of said first of said at least two catalytic flameless heater combustors facing said front of said second of said at least two catalytic flameless heater combustors. The heat absorber can include a honeycomb catalyst that is coated with a high temperature infrared absorbing coating to absorb radiant heat or a honeycomb catalyst that contains a precious metal and a washcoat coated on a substrate.

In some embodiments, each of said at least two catalytic flameless heater combustors comprises a high surface area fibrous pad coated with a precious metal. In some of these embodiments, the high surface area fibrous pad coated with a precious metal comprises a minimum surface area of 20 square meters per gram and a maximum surface area of 300 square meters per gram.

In some embodiments, the system further comprises at least one additional catalytic oxidizer removeably affixed above said top of said first of said at least two catalytic flameless heater combustors and also above said top of said second of said at least two catalytic flameless heater combustors to provide for oxidation of any stray organics that escape oxidation by either of said at least two catalytic flameless heater combustors.

In another aspect, certain embodiments of the disclosure include a system for destroying gaseous fugitive emissions by catalytic oxidation comprising (a) a vertically oriented first catalytic heater comprising a first catalyst chamber; (b) a vertically oriented second catalytic heater comprising a second catalyst chamber, the second catalytic heater facing the first catalytic heater; and (c) a manifold connected to the first catalytic heater and the second catalytic heater, the manifold configured with tubing for directing fuel gas and fugitive emissions to the first catalyst chamber and the second catalyst chamber. In one embodiment, a top distance between the top of the first catalytic heater and the top of the second catalytic heater is shorter than a bottom distance between the bottom of the first catalytic heater and the bottom of the second catalytic heater. In some embodiments, the distance between the first catalytic heater and the second catalytic heater ranges from about 1 inch to about 12 inches. In some embodiments, the difference between the top distance and the bottom distance comprises up to about 4 inches.

In some embodiments, the system includes an ignition device proximate to the first catalyst chamber and the second catalyst chamber for starting catalyst oxidation in the first catalyst chamber and the second catalyst chamber. In some embodiments, the ignition device further comprises an electric tubular heater in contact a catalyst pad in either the first catalytic heater or the second catalytic heater.

In some embodiments, the system further comprises a pressure regulator for regulating the pressure of the fuel gas and wherein the manifold further comprises a precision orifice through which the fuel gas flows to control the feeding of the fuel gas to the first catalyst chamber and the second catalyst chamber.

In some embodiments, the system further comprises (a) a first input tube forming part of the manifold; and (b) a first valve located along the first input tube wherein the setting of the first valve determines the amount of fuel gas sent to the first catalyst chamber and the second catalyst chamber. The system may further include a first flowmeter located along a fugitive gas feed inlet wherein the fugitive gas feed inlet forms part of the manifold and through which fugitive gas is delivered to the first catalyst chamber and the second catalyst chamber; and an electronic controller in communication with the first flowmeter wherein the electronic controller controls the setting of the first valve to reduce flow of the fuel gas if fugitive emissions are above an upper threshold or increase flow of the fuel gas if fugitive emissions are below a lower threshold. In some embodiments, the system further comprises a second flowmeter located along a first input tube wherein the first input tube forms part of the manifold and through which fuel gas is delivered to the system, and wherein the second flowmeter is in communication with the electronic controller to provide data to the electronic controller regarding how much fuel gas is passing through the first input tube at any given time.

In some embodiments, the manifold further comprises tubing through which an ignition gas is delivered to the first catalyst chamber and the second catalyst chamber.

In some embodiments, the manifold further comprises a first valve along a first tube used for delivering fugitive emissions to the first catalyst chamber and the second catalyst chamber, and a second valve along a second tube used for delivering hydrogen gas to the first catalyst chamber and the second catalyst chamber.

In some embodiments, the manifold is sized and shaped to deliver a mixture of fuel gas and fugitive emissions to the first catalytic heater and the second catalytic heater in substantially equal amounts.

In some embodiments, each of the first catalytic heater and the second catalytic heater comprises (a) a metal box including five walls including four side walls and one back wall; (b) an empty space defined by the metal box; (c) a perforated metal sheet cut to the size of the metal box; (d) a low density ceramic wool pad cut to the size of the metal box, wherein the metal sheet serves as a support for the ceramic wool pad; (e) a catalyst pad cut to the size of the metal box, wherein the ceramic wool pad serves to separate the perforated metal sheet from the catalyst pad; (f) a lid for holding the catalyst pad attached to the metal box; and (g) an aperture in the back wall of the metal box where the manifold is attached to the metal box for providing gas to the catalyst pad.

In some embodiments, the manifold further comprises (a) a first input for the introduction of fuel gas to the system; (b) a second input for introduction of fugitive emissions to the system; and (c) a third input for introducing an ignition gas to the system. In some embodiments, the system further comprises a radiant heat absorbing material positioned between the first catalytic heater and the second catalytic heater to absorb infrared radiation from the first catalytic heater and the second catalytic heater so that heat can be transferred by convection to air drafted between the first catalytic heater and the second catalytic heater. In some embodiments, the radiant heat absorbing material comprises a high temperature radiant absorbing outer coating. In certain embodiments, the radiant heat absorbing material comprises a sheet comprising apertures arranged in an array wherein the area of the apertures comprises from about 20% to about 70% of the total area of the sheet. In some embodiments, the radiant heat absorbing material comprises a metal tube formed into a serpentine shape for the flow of a heat exchange fluid through the metal tube.

In some embodiments, the system further comprises an oxidation catalyst positioned above the first catalytic heater and the second catalytic heater for polishing exhaust from the first catalytic heater and the second catalytic heater and oxidizing any ambient contaminants which might be in the air being drafted up proximate to the oxidation catalyst. In some embodiments, the oxidation catalyst comprises between about 20 and about 50 cells per square inch of entry surface. In certain embodiments, the oxidation catalyst is coated with an aluminum oxide coating, such coating further comprising precious metal impregnated therein. In certain embodiments, the precious metal comprises a metal selected from the group consisting of platinum, palladium, rhodium and combinations thereof.

In some embodiments, the first catalytic heater further comprises an array of a plurality of first catalytic heaters and wherein the second catalytic heater further comprises an array of a plurality of second catalytic heaters.

In another aspect, embodiments of the disclosure include a method for destroying gaseous fugitive emissions by catalytic oxidation, the method comprising the steps of (a) initiating catalyst oxidation by igniting a system for destroying gaseous fugitive emissions by catalytic oxidation, the system comprising a first catalytic heater and a second catalytic heater wherein the first catalytic heater is facing the second catalytic heater; (b) feeding fuel gas through a manifold to a first catalyst chamber of the first catalytic heater and a second catalyst chamber of the second catalytic heater for combustion; and (c) feeding fugitive emissions through the manifold to the first catalyst chamber and the second catalyst chamber for combustion.

In some embodiments, the step of feeding fuel gas through the manifold further comprises adjusting the flow of fuel gas through the manifold to achieve steady state operation of the system.

In some embodiments, the first catalytic heater is spaced from about 1 inch to about 12 inches away from the second catalytic heater.

In some embodiments, the step of feeding fuel gas through the manifold further comprises feeding the fuel gas through a precision orifice at a set pressure.

In some embodiments, the step of feeding fuel gas through the manifold further comprises reducing flow of the fuel gas through the manifold if fugitive emissions are above an upper threshold and increasing flow of the fuel gas through the manifold if fugitive emissions are below a lower threshold.

In some embodiments, the step of initiating catalyst oxidation further comprises the steps of (i) introducing an ignition gas through the manifold for a set time to heat the first catalytic heater and the second catalytic heater prior to feeding fuel gas into the manifold; and (ii) shutting off flow of the ignition gas when fuel gas is fed into the manifold.

In some embodiments, the step of initiating catalyst oxidation further comprises the steps of (i) introducing an ignition gas through the manifold; and (ii) mixing the ignition gas with the fuel gas to ignite the system.

In some embodiments, the initiating step is performed using an ignition gas at room temperature and without the use of a heated igniter. In these embodiments, the ignition gas comprises hydrogen, methane, methanol vapor or combinations thereof.

In some embodiments, the method further comprises the steps of (d) mixing the fuel gas with the fugitive emissions to form a gas mixture; and (e) feeding the gas mixture in substantially equal amounts to the first catalytic heater and the second catalytic heater.

In some embodiments, the method further comprises the steps of (d) absorbing heat from the first catalytic heater and the second catalytic heater using a radiant heat absorbing material positioned between the first catalytic heater and the second catalytic heater; and (e) transferring heat from the radiant heat absorbing material to drafted air proximate thereto. In certain embodiments, the radiant heat absorbing material comprises a metal tube formed into a serpentine shape and wherein the method further comprises the step of passing a heat transfer fluid through the metal tube.

In some embodiments, the method further comprises the step of polishing the exhaust from the first catalytic heater and the second catalytic heater and oxidizing any ambient contaminants which might be in the air drafted proximate thereto using an oxidation catalyst positioned above the first catalytic heater and the second catalytic heater. In certain embodiments, the method further comprises the step of directing the polished and oxidized exhaust gas to a heat exchanger to use the heat from the polished and oxidized exhaust gas for an industrial purpose.

In some embodiments, the method further comprises the steps of (d) measuring the amount of fugitive emissions entering the system using a flowmeter; and (e) controlling the amount of fuel gas entering the system based on the measured amount of fugitive emissions by adjusting the setting of a first valve along a tube that is delivering the fuel gas to the system.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

The figures are provided to illustrate concepts of the invention disclosure and are not intended to embody all potential embodiments of the invention. Therefore, the figures are not intended to limit the scope of the invention disclosure in any way, a function which is reserved for the appended claims.

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

The following detailed description may recite various descriptive terms such as horizontal, vertical, top, bottom, upward, downward, left, right, etc., when referring to the exemplary figures, but the present general inventive concept is not limited to any such terms or physical orientations. Such terms are used for convenience of description only, and could be reversed, modified, or interchanged without departing from the broader scope and spirit of the present general inventive concept.

The apparatus disclosed herein includes an array of at least two catalytic heaters formed by the impregnation of a high surface area fibrous pad with precious metals then backed by a low surface area insulating fibrous ceramic pad. The layers are then placed in a container made of metal which has one opening the size of the catalyst pad. The container also provides a chamber wherein fuel may enter through the back. Combustible fuel fills the chamber, which has an internal wall made of perforated metal such that the fuel may pass through the internal wall of the chamber and then through the low surface area fibrous ceramic pad. The fuel then passes to the catalyzed pad where flameless combustion takes place.

In some embodiments, the fuel chamber is made from a perforated or expanded metal sheet; the metal is typically polished stainless steel or polished aluminum. Pores in the metal can be made, such as by punching, cutting, or drilling, such that the porosity of the sheet is between 10.5 and 50%. The purpose of the polished metal sheet is to support the catalyst assembly, distribute the gas flow, and reflect infrared heat forward.

The fuel gas flow rate is preferably controlled by pressure and an orifice. Between the orifice and the back of the array entrance is a separate inlet pipe or tube, which is isolated by valves so as to assure deliver of the fuel gas to the device when closed and, when open, to allow an optional hydrogen gas to mix with the fuel gas for ignition purposes. Such valves then isolate the hydrogen gas feed line while allowing the fugitive emissions to mix with the fuel gas prior to entering the catalysis chamber for flameless catalytic destruction of the fugitive organics contained within the fugitive emissions.

Figure 1:
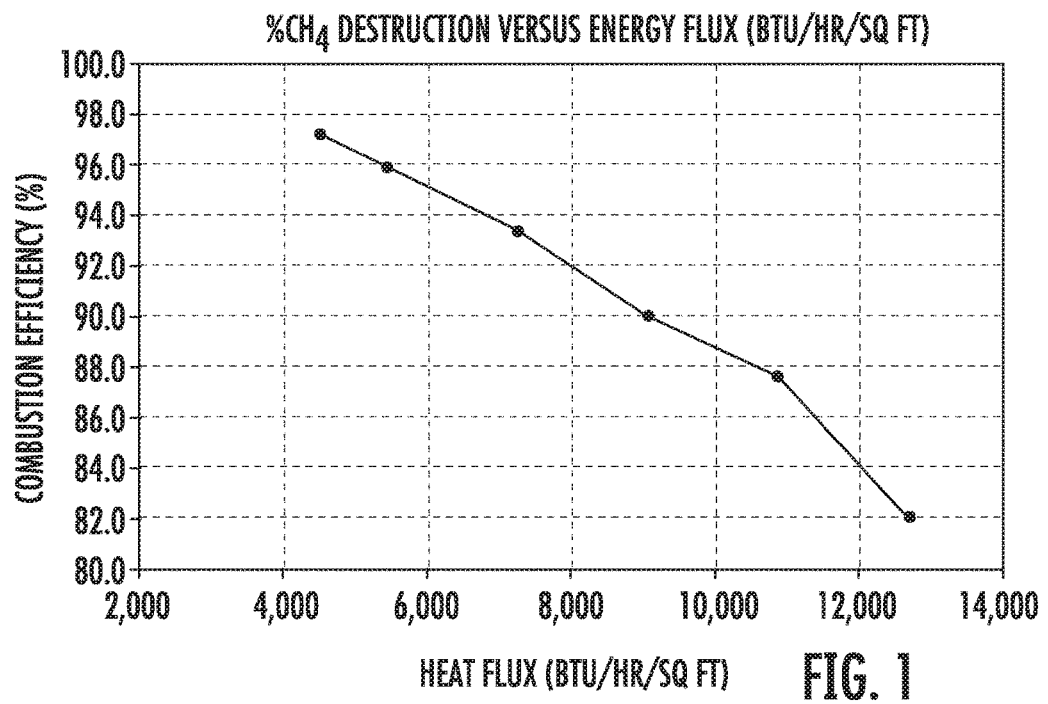
FIG. 1 shows a graph illustrating % $CH_4$ Destruction versus Energy Flux BTU/Hr/Sq Ft for a catalytic infrared heater powered by natural gas.

Catalytic infrared heaters powered by natural gas are useful for destroying fugitive gases because they produce IR radiation which is specific to the species formed during combustion ($CO_2$ and $H_2O$) and they emit this radiation which can be specifically absorbed by the heating target. The radiation they emit for the most part is in the 1-10 micron wave length. Unfortunately, these types of heaters are limited in the power density. If more than 5,000 BTU/hour per square foot equivalent of natural gas is used to power the heater then there is a decrease in the efficiency of combustion as shown in FIG. 1.

Figure 2:
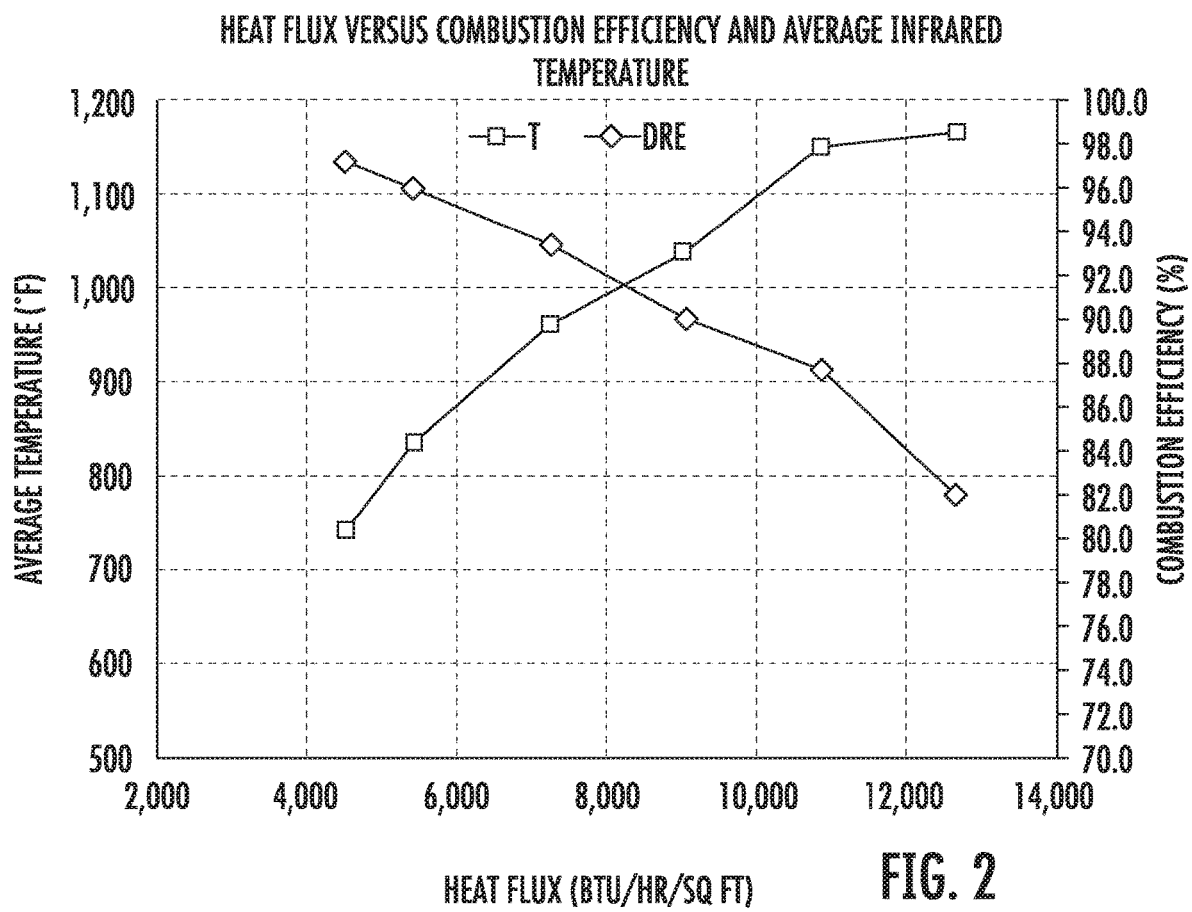
FIG. 2 shows a graph illustrating Heat Flux versus Combustion Efficiency and Average Infrared Temperature for a catalytic infrared heater.

The infrared temperature as measured by a pyrometer increases as the Energy flux increases as expected. Some commercial infrared gas burners try to achieve high temperature by increasing the energy flux (natural gas flow rate) but do so at the expense of increasing green-house emitting un-combusted methane. These effects are shown in FIG. 2.

Figure 3:
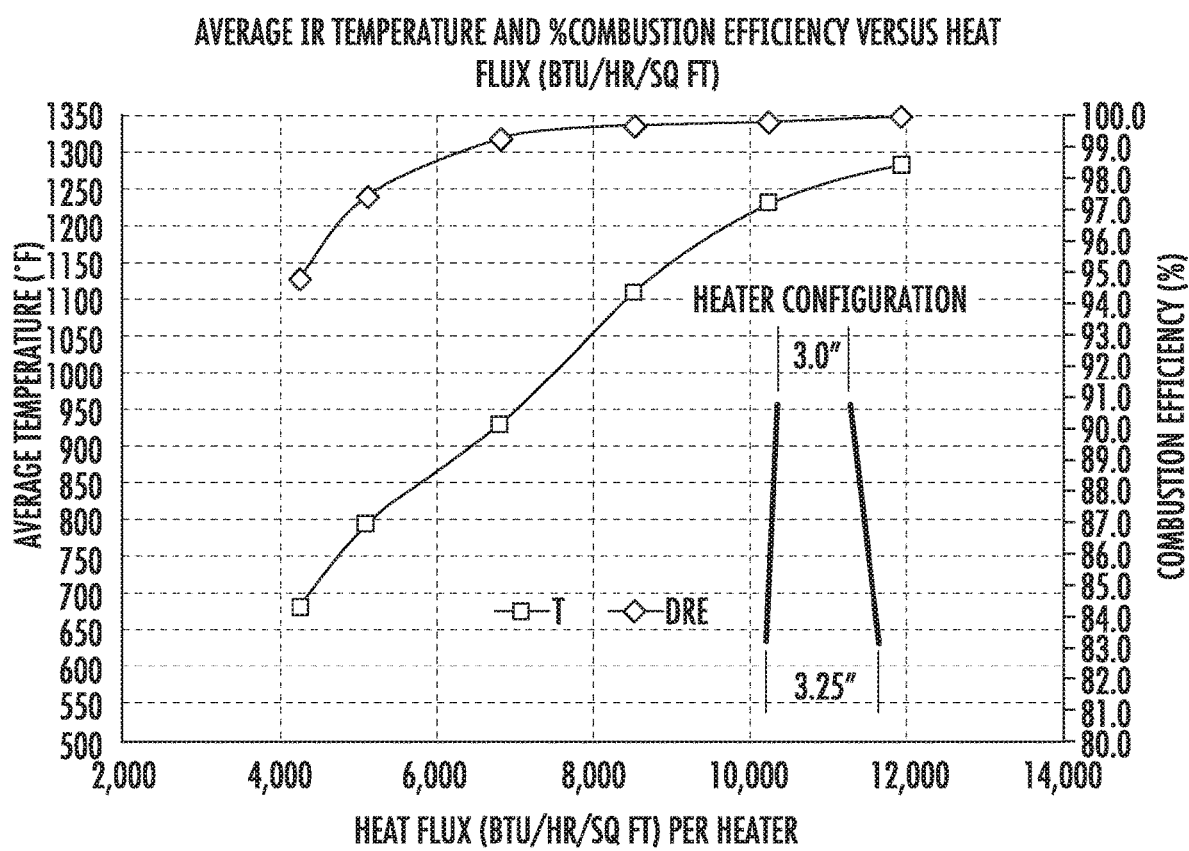
FIG. 3 shows a graph illustrating Average IR Temperature and % Combustion Efficiency versus Heat Flux for an embodiment of the apparatus described and disclosed herein.

Applicant has found unexpectedly that if two infrared heaters are placed face to face, both high average temperatures and high combustion efficiency can be achieved. FIG. 3 shows data reflecting this effect. This discovery opens several new applications for gas fired infrared heaters.

Applicant has also found that, if the face to face gas catalytic heaters are powered by fuel to 5,000 BTU/Hr/Sq Ft to sustain efficient methane combustion, the gas normally flared can be rerouted into the face to face infrared heaters such that up to 14,000 BTU/Hr/Sq Ft can be achieved with over 97% destruction efficiency.

A flameless catalytic destruction system 100 for flameless catalytic destruction of fugitive hydrocarbons was built with two infrared heaters (a first infrared heater 102A and a second infrared heater 102B). Each infrared heater was constructed as follows: A metal box 104 that is 9 to 14 inches (and more preferably 6 to 20 inches) tall, 18 to 24 inches (and more preferably 18 to 36 inches) wide and 1.5 to 2 inches deep was formed from metal sheet as shown for example in FIG. 4. A hole was cut into the back of the metal box 104 to receive the combustible gases. A perforated metal plate 106 was placed into the box 104 to allow for a dead space of from 0.25 to 0.75 inches in depth. Next a low-density ceramic fiber blanket 108 having a density of from 4 to 8 pounds per cubic foot was cut to fit on top of the perforated metal plate 106. Finally, a high surface area alumina fiber product such as Saffil having high surface area and low density coated with Platinum at 0.1 to 1.0% by weight (catalyst pad 110) was placed on top of the ceramic fiber blanket 108. Finally, a metal lid 112 with expanded metal 114 was placed on top and riveted in place. This assembly is an example of a first catalyst chamber 116A and is shown in the broader schematic of FIG. 5 and FIG. 6.

Figure 4:
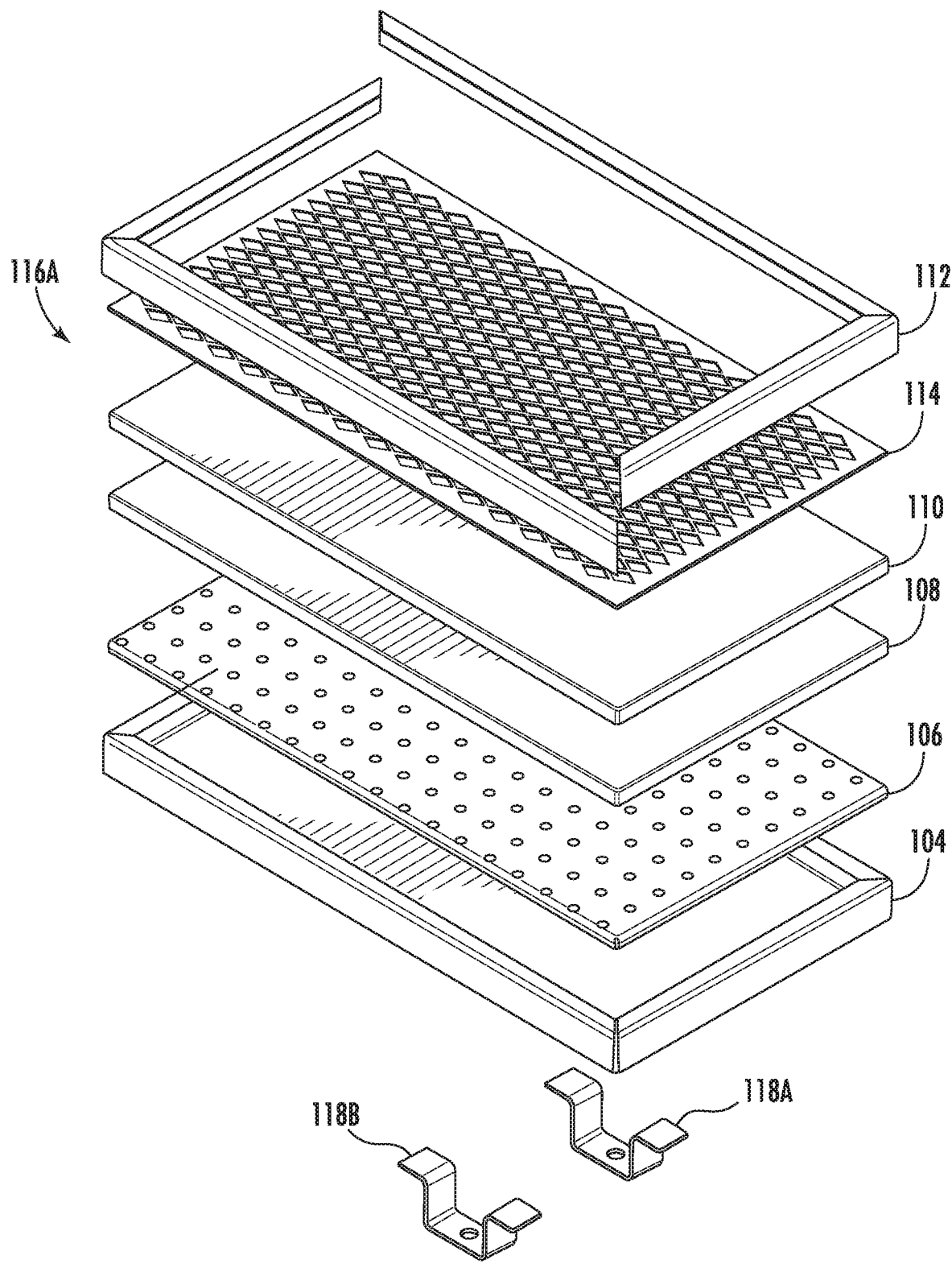
FIG. 4 shows a diagram illustrating an exploded view of a flameless catalytic heater.
Figure 5:
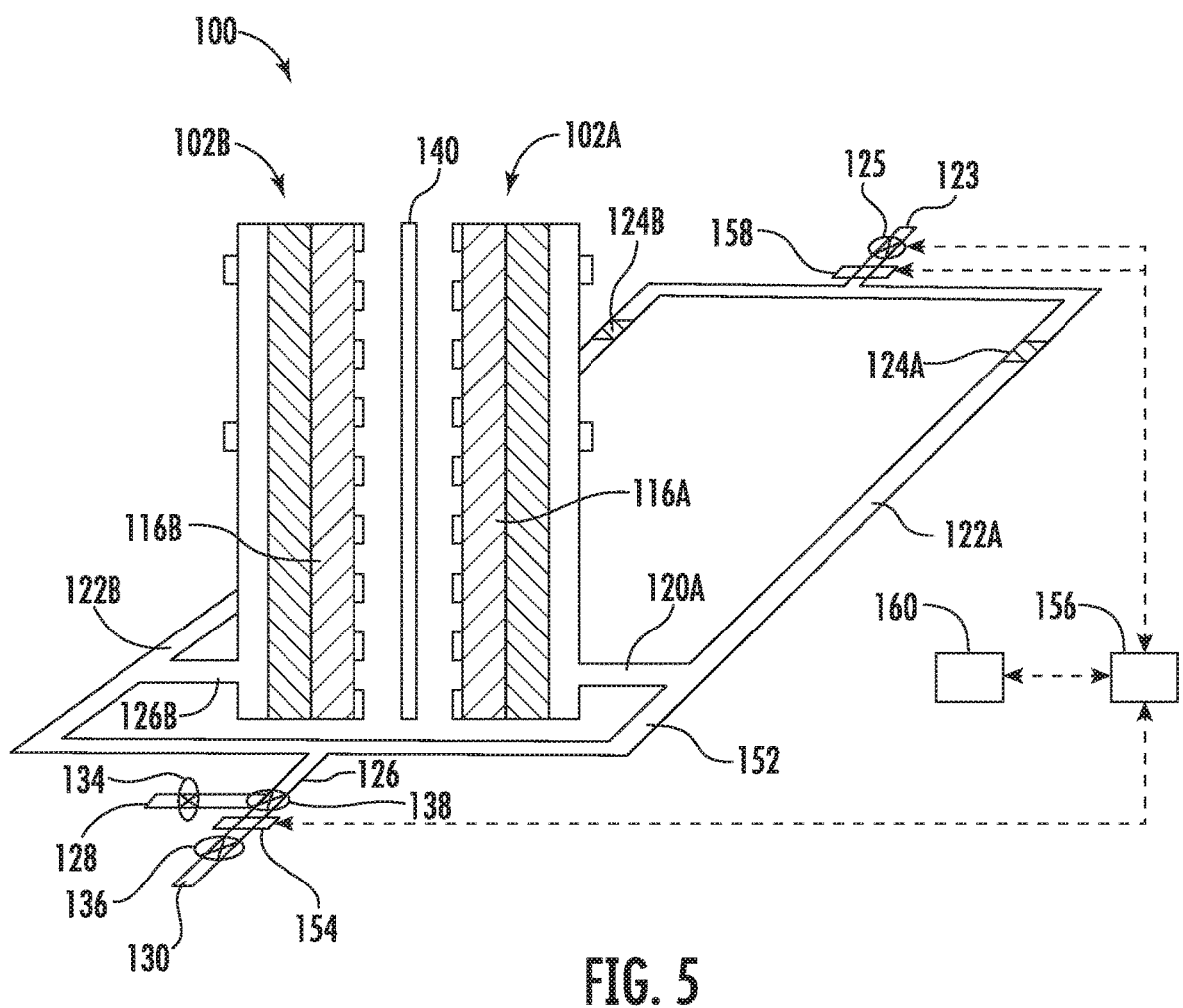
FIG. 5 shows a schematic diagram of an example of a system for flameless catalytic destruction of fugitive hydrocarbons.
Figure 6:
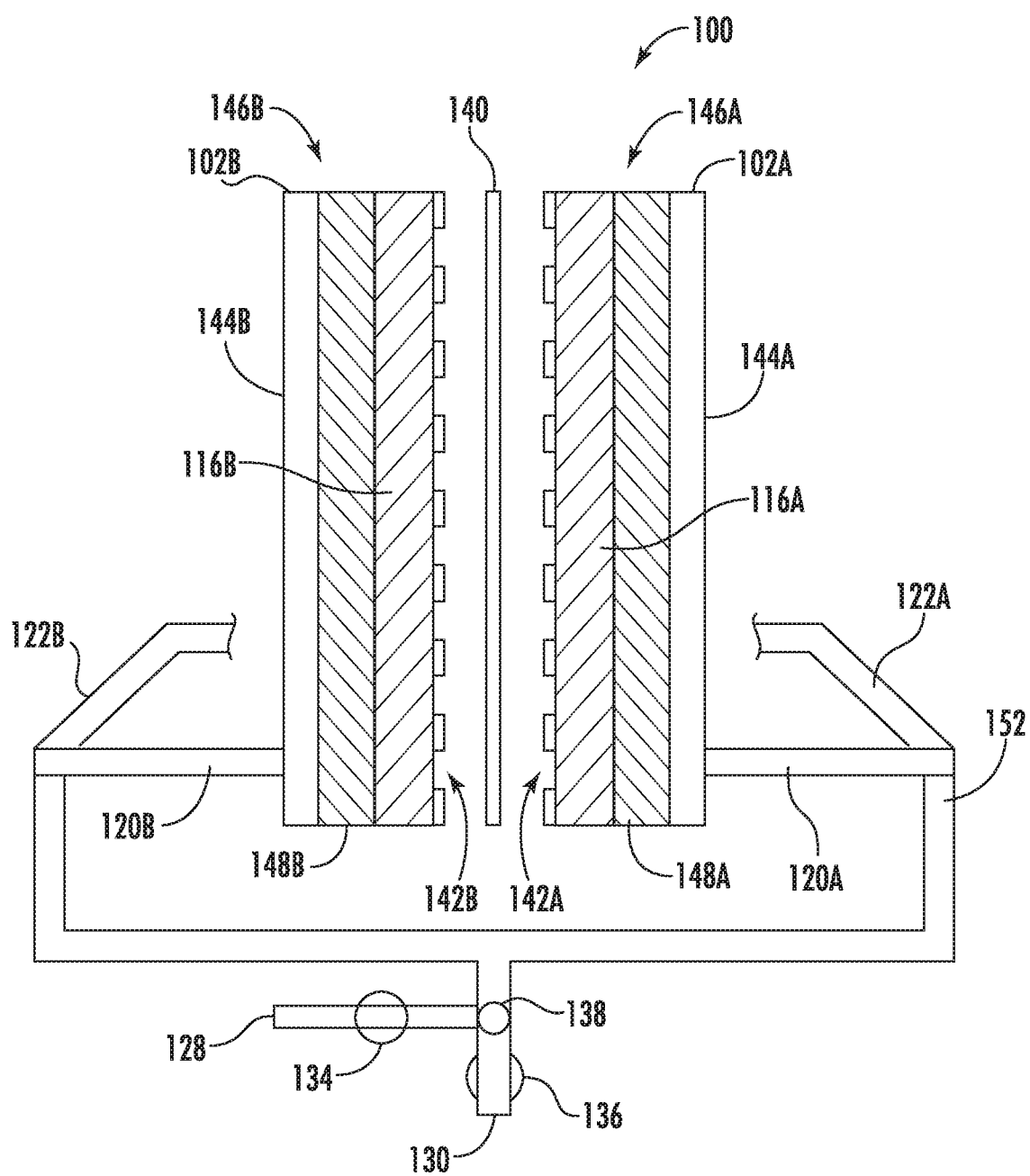
FIG. 6 shows a schematic diagram showing a different view of the system for flameless catalytic destruction of fugitive hydrocarbons shown in FIG. 5.

In the embodiment shown in FIG. 4, two brackets including a first bracket 118A and a second bracket 118B were attached to the back of the first infrared heater 102A to attach the first infrared heater 102A to a structural frame. For the embodiment shown in FIG. 5 and FIG. 6, a first intake tube 120A is attached to the bottom center of the back of the first catalyst chamber 116A and this structure is the same with the second infrared heater 102B and associated second catalyst chamber 116B as shown in FIG. 5 and FIG. 6. Feeding into the first intake tube 120A is a first feeder tube 122A. The first feeder tube 122A extends from a first input tube 123 and the first feeder tube 122A is preferably fitted with a first orifice 124A sized to deliver the correct amount of fuel gas to produce 5,000 BTU/Hour/Square Foot of catalyst surface at the pressure of the fuel gas. A first valve 125 is located along the first input tube 123 for controlling the flow of fuel gas.

Also attached downstream from the first orifice 124A is a second input tube 126 which has a "T" fitting with a first feed inlet 128 and a second feed inlet 130. The first feed inlet 128 is optional, preferably feeding tanked hydrogen for lighting the catalyst chamber 116A. The second feed inlet 130 is to deliver the process (fugitive) gas to be destroyed.

The first feed inlet includes a second valve 134 and the second feed inlet 130 includes a third valve 136, both allowing flow from the process (fugitive) and the hydrogen starter gas but preventing back flow of the fuel gas. A selection valve 138 could be included so that process gas and hydrogen cannot be simultaneously presented to the catalyst chamber 116. The hydrogen provides an alternative way to ignite the catalytic combustion process instead of the time-consuming use of embedded electrical heaters or the unsafe external ignition by flame or spark.

The two heaters (102A and 102B) are started by allowing the fuel gas, preferably rated at 5,000 BTU/Hour/Square Foot, to mix with Hydrogen at a rate of no less than 500 BTU/Hr/Square Foot of heater and preferably at no less than 600 BTU/Hr/Square Foot. The heater should begin oxidizing the natural gas within 60 seconds (less than one liter of hydrogen per square foot of heater surface or 600 BTU/Hr/Sq Ft heat generated by the hydrogen). Then the hydrogen is turned off and the natural gas fuel will take a few more minutes to get a uniform catalytic oxidation across the entire surface of the heater.

The two heaters (102A and 102B) are placed facing one another and the process gas is split and fed approximately equally into the fuel stream of both heaters 102. A perforated, expanded, or tubular skid metal sheet 140 painted with a black high temperature inorganic material is preferably placed in the center between two heaters (102A and 102B).

Using this configuration, the efficiency of total methane combustion is measured by calculating the total emissions of methane, carbon dioxide and carbon monoxide. According to the equation below:

$$\text{Complete Combustion Efficiency} = 100 \times (CO_2)/(CO_2 + CH_4 + CO)$$

Example 1

Two heaters 18.50 inches long and 9.875 inches wide were used. The catalyst area was 17.25 inches long and 8.75 inches wide with a surface area of 1.05 square feet ($Ft^2$). This is the standard configuration. Each was placed face to face 1.5 inches apart at the top and two and three eighths inch apart at the bottom. The heaters used in this example were fed natural gas at a heating rate of 5,000 BTU/Hr/$Ft^2$ The fugitive gas was added until the heat from fugitive gas alone was about 7,250 BTU/Hr/$Ft^2$ (i.e., 0.128 standard cubic feet per minute [SCFM]) yielding a total heat value of 12,250 BTU/Hr/$Ft^2$. The combustion efficiency, flow rate of fugitive gas and the Infrared Temperature were measured. The results are shown below in Table 1:

TABLE 1

| Fugitive Gas, SCFM | % $CH_4$ DRE | Temperature ° F. |
| --- | --- | --- |
| 0.126 | 98.90 | 1622 |
| 0.098 | 96.18 | 1647 |
| 0.070 | 96.01 | 1420 |
| 0.042 | 96.84 | 1363 |
| 0.014 | 97.62 | 1129 |
|  | 97.54 | 1020 |

These results show excellent destruction efficiency but the temperatures were above the ignition temperatures of hydrocarbons that could be in the surrounding environment.

Example 2

The heaters were arranged as in example 1 with the exception that the spacing was 3 inches apart at the top and 3.25 inches at the bottom. The results are shown below in Table 2:

TABLE 2

| Fugitive Gas, SCFM | % $CH_4$ DRE | Avg. Temp. ° F. |
| --- | --- | --- |
| 0.129 | 98.58 | 1447 |
| 0.100 | 98.58 | 1378 |
| 0.072 | 98.34 | 1243 |
| 0.043 | 98.31 | 1140 |
| 0.014 | 95.93 | 857 |
| 0.000 | 92.83 | 775 |

These results show that the temperature can be reduced by increasing the distance between the face to face heaters for 1.25 inches to 3 inches without a great sacrifice of conversion efficiency.

Example 3

The set up was the same as in Example 2 except that a cooling heat exchanger was made from 0.25 inch diameter stainless steel tubing. The heat exchanger was made by bending the tubing back and forth serpentine to produce straight runs the length of the heater and approximately one to one and a quarter inch apart. The tubing was painted with black high temperature paint sold as stove paint useful for temperatures up to 2000° F. Water was pumped through the tubing while the fugitive gas was increased. The water rate was 150 cc per minute.

TABLE 3

| Fugitive Gas, SCFM | % CH$_4$ DRE | Avg. Temp. ° F. |
|---|---|---|
| 0.129 | 99.95 | 1312 |
| 0.100 | 99.83 | 1287 |
| 0.072 | 98.10 | 1150 |
| 0.043 | 98.20 | 1101 |
| 0.014 | 99.30 | 925 |
| 0.000 | 98.87 | 727 |

These results showed that lower temperatures are obtained by cooling the zone between the heater faces. This option would add complexity to field operation and would require a pump and therefore electricity and water, so an alternative method was examined and is shown in Example 4.

Example 4

The face to face heaters produce infrared radiation which is not absorbed by air. So expanded metal was painted with the high temperature paint described in Example 3 and was used to place between the face to face heaters with the expectation that the painted expanded metal would absorb some of the radiation and that the air would be heated by the hot perforated metal. These expanded metal sheets were spray painted with a black high temperature inorganic paint such as sold by Rust-Oleum 248903 Automotive 2000° F. Degree Spray Paint, Flat Black.

The openings in this sheet were diamond shaped with a length of 1.91 inches long and 0.67 inches width. There were 165 of these diamond shaped openings per square foot. We found that these plates absorbed some of the infrared radiation and became hot and then transferred their heat to the drafted air produced by the heaters.

TABLE 4

| Fugitive Gas, SCFM | % CH$_4$ DRE | Avg. Temp. ° F. |
|---|---|---|
| 0.129 | 98.79 | 1301 |
| 0.100 | 97.20 | 1214 |
| 0.072 | 99.50 | 1103 |
| 0.043 | 98.90 | 920 |
| 0.014 | 96.00 | 775 |
| 0.000 | 93.30 | 658 |

The results compared to Example 2 shows that the Maximum temperature is lower by 146° F. which puts it below the auto-ignition temperature of Methane.

Example 5

The experiment of Example 4 was repeated but the expanded metal diamond shaped openings were 0.299 inches long and 0.124 inches wide. There were 3204 of these openings in a square foot. The results are shown in Table 5:

TABLE 5

| Fugitive Gas, SCFM | % CH$_4$ DRE | Avg. Temp. ° F. |
|---|---|---|
| 0.129 | 99.95 | 1277 |
| 0.100 | 99.80 | 1224 |
| 0.072 | 99.40 | 1143 |
| 0.043 | 99.10 | 939 |
| 0.014 | 97.80 | 757 |
| 0.000 | 93.50 | 658 |

Example 6

The experimental set up was the same except as Example 4 instead of expanded metal perforated metal with round holes approximately 0.143 inches in diameter and 6,048 holes per square foot was placed between the heaters. The results are shown below in Table 6:

TABLE 6

| Fugitive Gas, SCFM | % CH$_4$ DRE | Avg. Temp. ° F. |
|---|---|---|
| 0.129 | 99.94 | 1272 |
| 0.100 | 99.80 | 1204 |
| 0.072 | 99.70 | 1072 |
| 0.043 | 99.30 | 895 |
| 0.014 | 97.40 | 771 |
| 0.000 | 94.80 | 661 |

Example 7

The same experiment was performed as in Example 6 except the perforated metal had holes 0.042 inch diameter and 26,928 holes per square foot. The results are shown below in Table 7:

TABLE 7

| Fugitive Gas, SCFM | % CH$_4$ DRE | Avg. Temp. ° F. |
|---|---|---|
| 0.129 | 99.95 | 1221 |
| 0.100 | 99.80 | 1165 |
| 0.072 | 99.50 | 1134 |
| 0.043 | 97.30 | 949 |
| 0.014 | 97.00 | 800 |
| 0.000 | 94.96 | 658 |

Example 8

The experiment procedure from Example 7 was repeated except the metal inserted between the catalytic heater faces had tubular slits. The configuration is like a basket weave. In the direction perpendicular to the heater faces there is no line of sight for radiation from one heater to fall on the other. The openings horizontal to the face of the heaters are 0.123 inches long and 0.443 inches deep. The air and heater exhaust flows up through channels parallel to the heater face. The results are shown below in Table 8:

TABLE 8

| Fugitive Gas, SCFM | % CH$_4$ DRE | Avg. Temp. ° F. |
|---|---|---|
| 0.129 | 98.50 | 1256 |
| 0.100 | 98.70 | 1175 |
| 0.072 | 99.60 | 1129 |
| 0.043 | 96.10 | 948 |
| 0.014 | 97.00 | 772 |
| 0.000 | 96.10 | 638 |

Example 9

Figure 7:
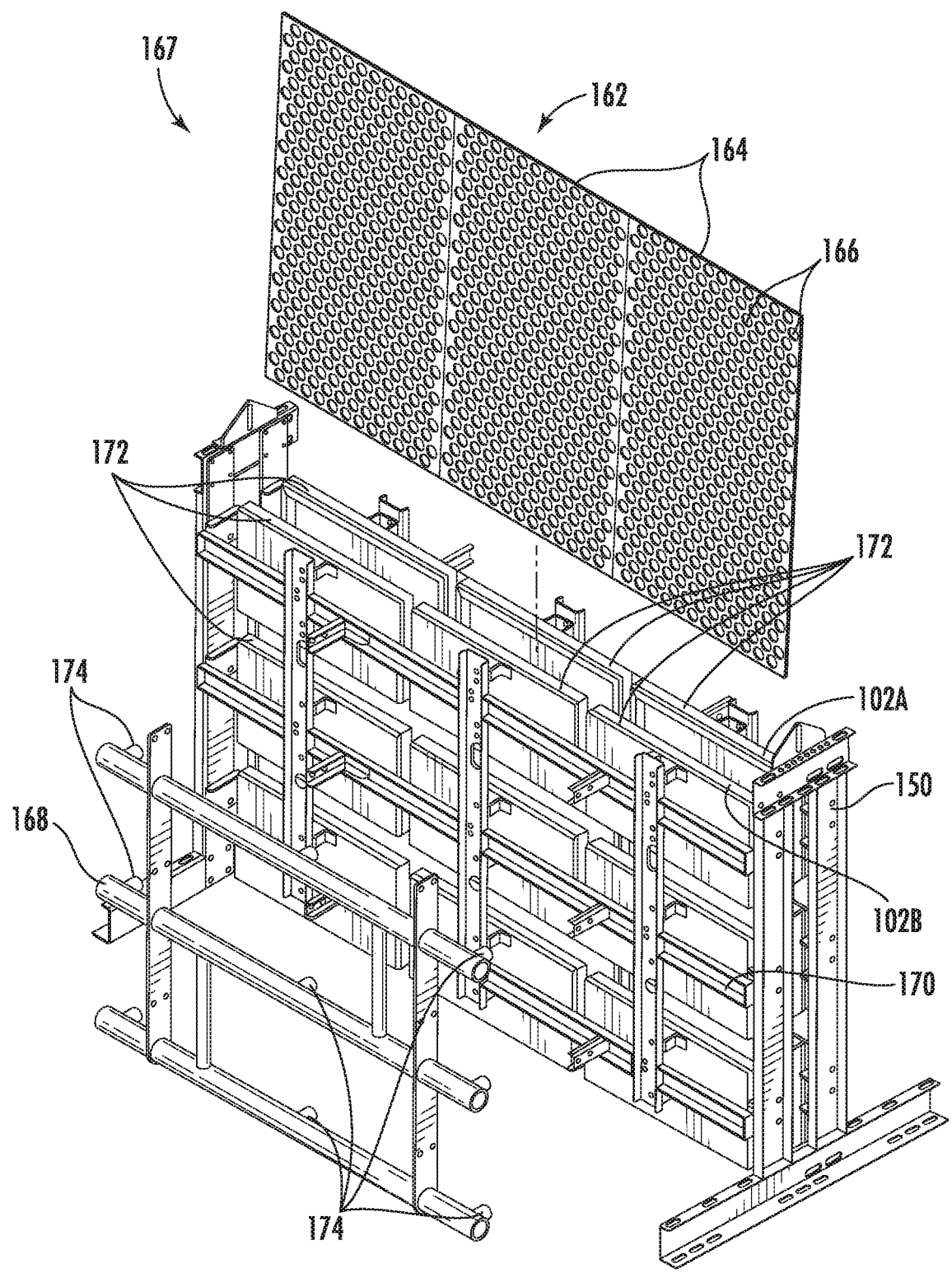
FIG. 7 shows a diagram illustrating a partially exploded perspective view of an example of a system for flameless catalytic destruction of fugitive hydrocarbons including a first 3×3 set of heaters facing a second 3×3 set of heaters and the overall apparatus further including an optional heat absorber inserted between the sets of heaters.
Figure 8:
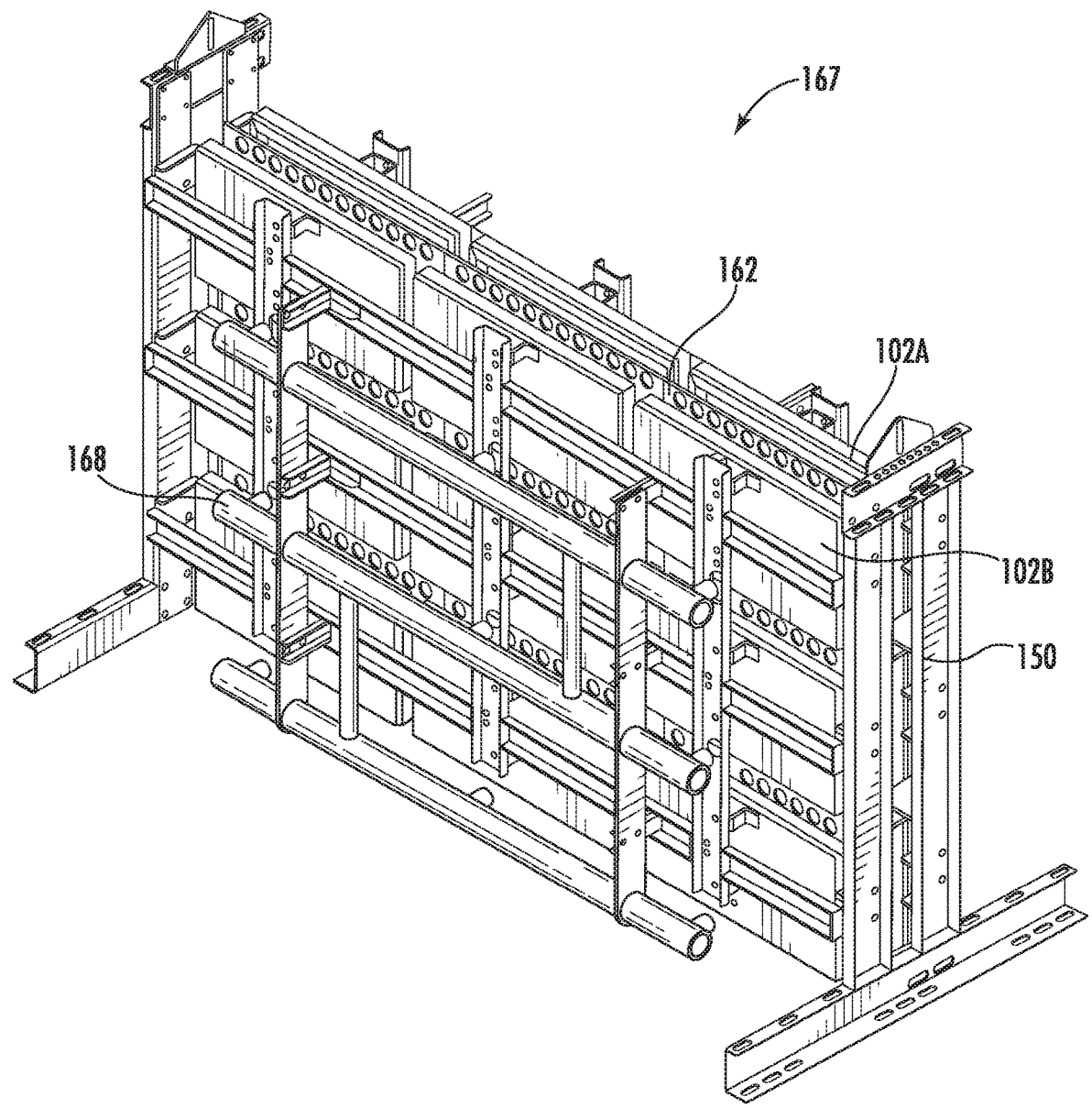
FIG. 8 shows a diagram illustrating a non-exploded view of the example system for flameless catalytic destruction of fugitive hydrocarbons shown in FIG. 7.

In order to simulate field conditions where 1.5 cubic feet per minute of fugitive gas were to be destroyed the apparatus described was tested as follows: An array of 18 heaters (9 facing 9) of standard configuration was used. They were arranged with three units by three units on the left side and three by three on the right side (as shown in FIG. 7 and FIG. 8) with both banks of heaters facing one another with a space of three and one half inches between them. As shown in FIG. 7, the perforated metal placed between the heaters equidistant from either bank of heaters was perforated metal with round holes approximately 0.143 inches in diameter and 6,048 holes per square foot. The distance between the array units is determined by optimizing efficiencies; typically the distances between units for the top is 2 to 12 inches apart and, similarly, 2 to 12 inches for the bottom.

The exhaust from the top of the array of heaters is directed through an optional honeycomb catalyst structure. In some ideal embodiments, the honeycomb structure includes 40 cells per square inch which is wash coated with a metal oxide, such as, for one example, aluminum oxide, with surface area of 100 square meters per gram coated with 10 grams of Pt per cubic foot of catalyst. Optimally, the coating is a high temperature IR absorbing ceramic coating to absorb the radiant heat and transfer this heat to the drafted air.

The measured destruction efficiency of the honeycomb CO catalyst was 97.1% with an average temperature of 1,105° F. The exhaust from the heater surface can be as much as 20 ppm to 40 ppm but CO emissions from the honeycomb catalyst was an average of less than 2 ppm.

Example 10

In order to start the combustion process on the surface of a catalytic heater the pad can be preheated by electrical means or with a flame. These methods require a long time, present safety issues and are not convenient for automation or use in remote sites. We have found that if Hydrogen gas which burns catalytically at room temperature is introduced into the fuel (natural gas), the heat of reaction at room temperature is enough to quickly initiate natural gas combustion.

Figure 9:
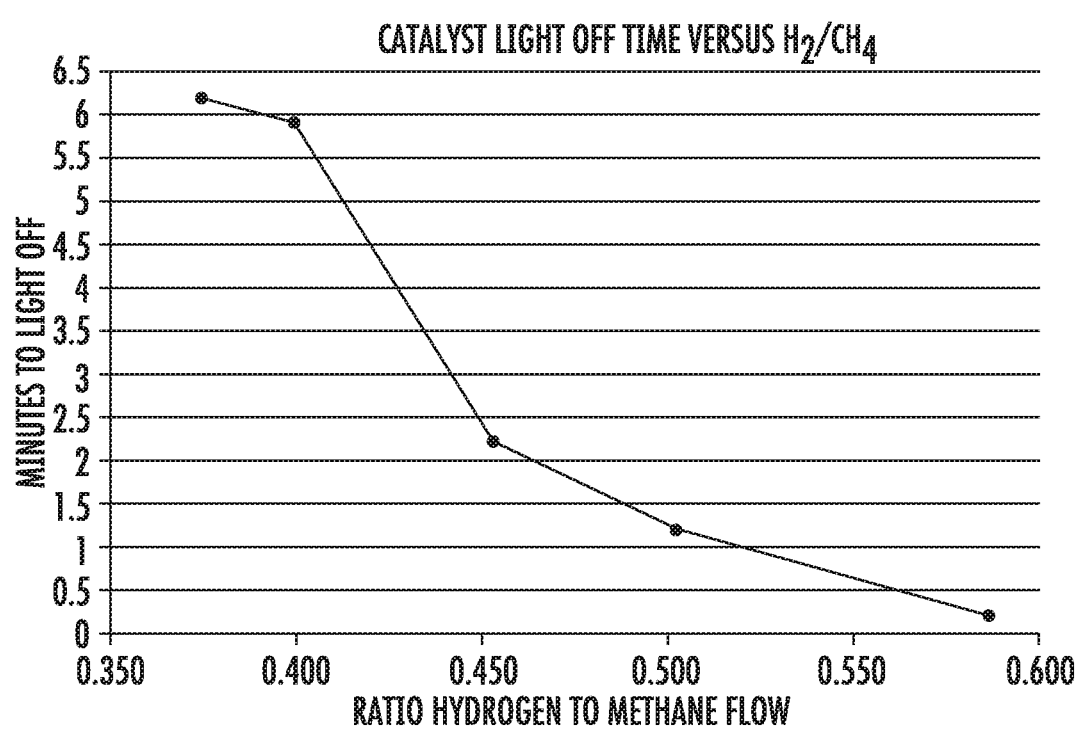
FIG. 9 shows a graph illustrating Catalyst light off time versus $H_2/CH_4$.

The system described in Example 2 was used to measure the time required to light off the catalyst of the system. The natural gas flow was adjusted to 4,300 BTU/square foot and hydrogen was introduced by a controllable mass flow meter. The ratio of Hydrogen flow rate to natural gas flow rate was calculated and plotted against the time required to initiate combustion as measured by catalyst temperature and combustion efficiency. The results are shown in FIG. 9.

Example 11

The heater assembly as in Example 9 using 18 approximately 1 square foot catalytic heaters was used to test the efficiency of destruction by oxidation of Benzene, Ethyl-Benzene, Toluene and Xylene common contaminates of natural gas. Each BTEX component was tested individually by injecting suitable liquid volumes of each contaminant to achieve 233 ppmv and 447 ppmv in the vaporized gas feed. The carrier gas was 0.035 standard cubic foot per minute of Methane mixed with 1.24 cubic feet per minute of natural gas. The results shown below indicate that over 95% destruction of methane and nearly 100% destruction of each of the BTEX compounds.

TABLE 9

| | Destruction | |
|---|---|---|
| Xylene | % $CH_4$ | % Xylene |
| 233 ppm | 95.1 | 100 |
| 447 ppm | 95.1 | 100 |
| Toluene | % $CH_4$ | % Toluene |
| 233 ppm | 95.1 | 100 |
| 447 ppm | 95.1 | 100 |
| Ethyl benzene | % $CH_4$ | % Ethyl benzene |
| 233 ppm | 95.1 | 100 |
| 447 ppm | 95.15 | 100 |
| Benzene | % $CH_4$ | % Benzene |
| 233 ppm | 95.1 | 100 |
| 447 ppm | 95.21 | 100 |

The present general inventive concept, in some of its embodiments, can include at least one system for destroying fugitive organic vapor emissions, the system comprising at least two catalytic flameless heater combustors, the first of the at least two catalytic flameless heater combustors having a front, a back, a top, and a bottom, the second of the at least two catalytic flameless heater combustors having a front, a back, a top, and a bottom. The at least two catalytic flameless heater combustors are removeably affixed to a support structure so as to have the front of the first of the at least two catalytic flameless heater combustors facing the front of the second of the at least two catalytic flameless heater combustors.

Optionally, a heat absorber can be inserted between the front of the first of the at least two catalytic flameless heater combustors that is facing the front of the second of the at least two catalytic flameless heater combustors. Optionally, and either in addition to or irrespective of any other options, an oxidation catalyst (s) can be removeably affixed above the top of the first of the at least two catalytic flameless heater combustors; the optional oxidation catalyst(s) could, optimally, be oriented so as to be also above the top of the second of the at least two catalytic flameless heater combustors. This optimal orientation above the tops of both of the at least two catalytic flameless heater combustors should provide for oxidation of any stray organics or other contaminants that escape oxidation by either of said at least two catalytic flameless heater combustors. As an example, such contaminants may include organic compounds, BTEX and/or chlorinated organic compounds.

The system of the present general inventive concept can be ignited by introducing a fuel gas mixed with gaseous vapors, such as hydrogen or methanol vapors through the at least two catalytic flameless heater combustors. Alternatively, the system can be ignited by more conventional methods such as an embedded heater or by an external flame or spark, among some examples. Once the system is ignited and the temperature throughout the system is sufficiently high, the start up fuel gaseous vapors can be discontinued, as the system should then operate in steady state mode. At this point, the system can be ready to accept fugitive gases, such as, for one example, hydrocarbons, for reduction, destruction, and elimination.

In some embodiments, the catalytic flameless heater combustors are made by impregnation of a high surface area fibrous pad with precious metals and then backed by a low surface area insulating fibrous ceramic pad. In some embodiments, the high surface area fibrous pad may have a minimum surface area of 20 square meters per gram of precious metal coating and a maximum surface area of 300 square meters per gram of precious metal coating, with the precious metal content being between 0.05% and 5%. The high surface area fibrous pad and the low surface area insulating pad are then layered and placed in a container made of metal as shown for example in FIG. 4. The metal container has an opening the size of the layered pads. The metal container and pads therein thus provide a chamber (e.g., the first catalyst chamber 116A) wherein the ignition fuel may enter. Alternatively and when at operational temperatures, the metal container and pads therein provide a chamber wherein the contaminant fugitive gases may enter to be oxidized. The chamber may contain an internal wall; in some embodiments, the wall is made of perforated metal. In some embodiments, as the chamber fills with a gas, the gas can pass through the internal wall, then through the low surface fibrous ceramic pad and then the catalyzed pad where flameless combustion occurs.

In some embodiments, a manifold may be used to feed fuel gas into the overall system. In some embodiments, a manifold may be used to feed contaminant gas into the system. In some exemplary embodiments, a dual-purpose manifold may be used to first feed fuel gas into the system and also feed contaminant gas into the system.

Advantages to the present general inventive concept include destruction of such fugitive organic gases, such as, for example, hydrocarbons including benzene, ethyl benzene, toluene, and xylene without the formation of nitrogen oxides, or soot. After passing through the system as described herein, any fugitive gases or post-process gas molecules that escape in the drafted air can be eliminated by channeling the drafted air through an optional oxidation catalyst or array of such catalysts, that can be placed at the exhaust outlet of the system. In some embodiments, this optional oxidation catalyst or array of catalysts can be placed horizontally above the at least two catalytic flameless heater combustors that can be oriented vertically so as to face one another, and the drafted air can be directed to flow first through the at least two catalytic flameless heater combustors and then next flow vertically upwards through the optional oxidation catalyst or array of oxidation catalysts.

As shown in FIG. 6, the first infrared heater 102A includes a front 142A, a back 144A, a top 146A, and a bottom 148A. The second infrared heater 102B includes a front 142B, a back 144B, a top 146B, and a bottom 148B. With reference to FIG. 7 and FIG. 8, the first infrared heater 102A and the second infrared heater 102B are preferably removeably affixed to a support structure such as, for example, support structure 150 so as to have the front 142A of the first infrared heater 102A facing the front 142B of the second infrared heater 142B.

As further illustrated in FIG. 5 and FIG. 6, the back 144A of the first infrared heater 102A can be optionally fitted with a first bracket 118A and, also optionally, a second bracket 118B for attaching the first infrared heater 102A to a frame such as, for example, the support structure 150 shown in FIGS. 7-10. The second infrared heater 102B preferably includes brackets also. These brackets 118 provide for vertical stabilizing of each of the at least two infrared heaters 102 onto the support structure 150, and also can provide for securing each of the at least two infrared heaters 102 in an array pattern as shown in FIGS. 7-10. On the back 144A of the first infrared heater 102A is attached the first intake tube 120A. On the back 144B of the second infrared heater 102B is attached the second intake tube 120B. The intake tubes 120 can be connected to the first feeder tube 122A and the second feeder tube 122B, respectively (system feeder tubes 122). A fuel source (not shown) feeds fuel gas into the system via the first input tube 123 and the system feeder tubes 122. Between the first feeder tubes 122 and the intake tubes 120 are preferably located the first orifice 124A and a second orifice 124B. The orifices 124 can serve to control fuel gas flow into intake tubes 120, so as to maximize efficiency of the system. In the exemplary embodiment shown in FIG. 5 and FIG. 6, the first input tube 123 is designed to branch into the two system feeder tubes (122A and 122B) so as to feed fuel gas into each of the at least two infrared heaters 102, with each branch of the system feeder tubes 122 having an identical orifice (124A or 124B) before intake tubes 120, to feed fuel gas in equal volume to each of the at least two infrared heaters 102 in any multi-heater array.

Further illustrated in FIG. 5 and FIG. 6 is the second feed inlet 130 (the fugitive gas inlet), which feeds the fugitive gas to flameless catalytic destruction system 100 for purposes of purifying the fugitive gas. Between the second feed inlet 130 and the first intake tube 120A is the third valve 136 which serves to control flow of the fugitive gas into an overall manifold array 152 (defined as including the intake tubes 120, feeder tubes 122, first input tube 123, second input tube 126, first feed inlet 128 and second feed inlet 130) and prevent back flow. Optionally, a first feed inlet 128 (for inserting starter gas) and the second valve 134 forms part of the system 100. When included, the second valve 134 serves to control flow of the starter gas into the manifold array 152 and to prevent backflow.

In a preferred embodiment, the system 100 further includes a first flowmeter 154 located along the second feed inlet 130 to measure the amount of fugitive gas entering the system 100. The system 100 preferably further includes an electronic controller 156 in communication with the first flowmeter 154 to receive data regarding the amount of fugitive gas entering the system 100. The electronic controller 156 is used to control the setting of the first valve 125 to control the amount of fuel gas entering the system 100 based on the data from the first flowmeter 154. The electronic controller 156 may accomplish this, for example, by electronically controlling a solenoid or other similar device known in the art that could be used to adjust the setting of the first valve 125. In a preferred embodiment, the system 100 further includes a second flowmeter 158 for measuring the amount of fuel gas entering the system 100 wherein the second flowmeter 158 can also provide data to the electronic controller 156. The data can be delivered from the first flowmeter 154 and the second flowmeter 158 to an electronic processor 160 in communication with the electronic controller 156 wherein the electronic processor 160 can be used to analyze the data, compare the flowrate of fuel gas with the flow rate of fugitive gas, and calculate the setting at which the first valve 125 should be set for optimum performance of the system 100.

Optionally, and as illustrated for example in FIG. 7 and FIG. 8, in some exemplary embodiments, a heat absorber 162 can be inserted between the front 142A of the first infrared heater 102A facing the front 142B of the second infrared heater 102B. In some embodiments, the heat absorber 162 can be composed of a plurality of segments 164 to provide for partial or complete pairing of the heat absorber 162 as with each of the at least two infrared heaters 102. In some embodiments, the heat absorber 162 can include optional holes 166, to provide additional surface area within the constructs of heat absorber 162. Shown in FIG. 7 and FIG. 8 is a compound flameless catalytic destruction system 167 including a compound manifold array 168 for serving a heater array 170 of a plurality of infrared heaters 172 (for the example shown in FIGS. 7-10, 3×3 on each side for a total of 18 infrared heaters which includes 9 infrared heater pairs facing each other). The compound manifold array 168 includes intake tubes 174, here illustrated in multiples to reflect one intake tube 174 per each of the infrared heaters 172.

Figure 10:
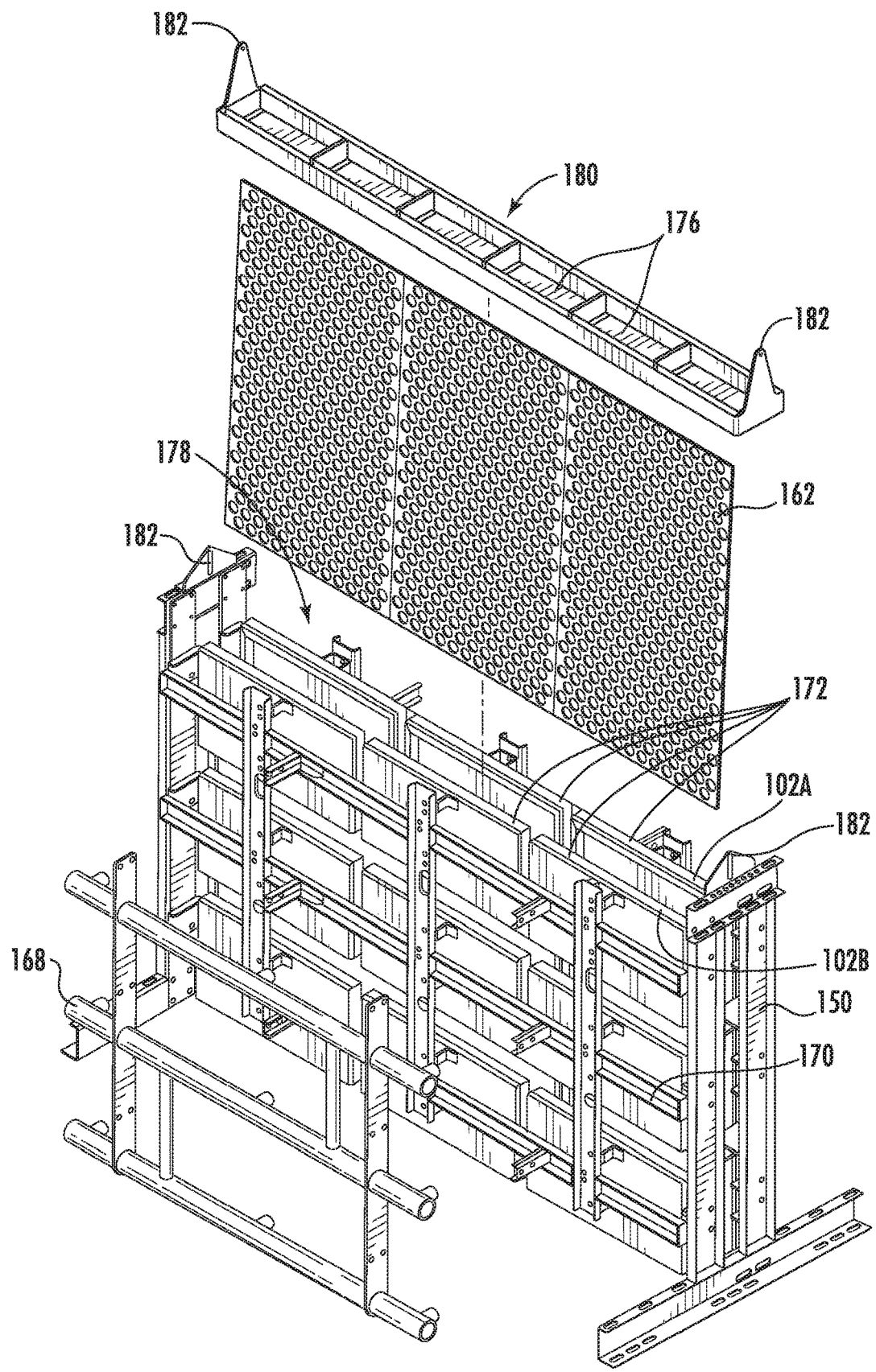
FIG. 10 shows a diagram illustrating another view of an embodiment of the present general inventive concept including an optional heat absorber and an optional oxidation catalyst.
Figure 11:
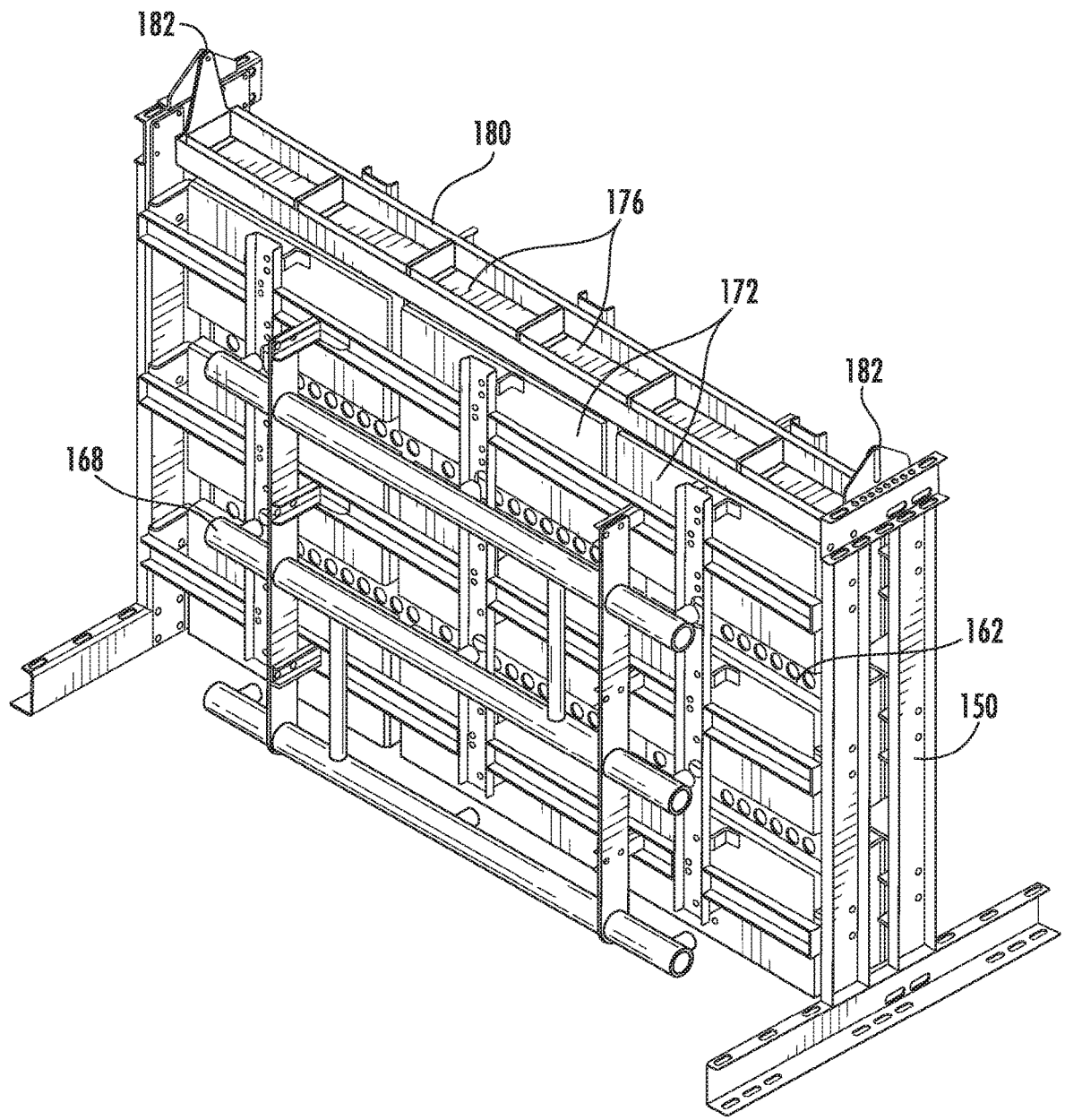
FIG. 11 shows a diagram illustrating another view of an embodiment of the present general inventive concept including an optional heat absorber and an optional oxidation catalyst.

Optionally, and in addition to any other options, in some exemplary embodiments, as illustrated in FIG. 10 and FIG. 11, an at least one oxidation catalyst 176 can be removeably affixed above a top 178 of the heater array 170. This optimal orientation above the top 178 of the heater array 170 can provide for oxidation of any stray organics that escape oxidation by any of the heaters 172. Although this example shows multiple pairs of heaters 172, the concept of using an oxidation catalyst above heaters can also be used in embodiments that include only two heaters paired together. The oxidation catalyst 176 can be utilized in multiples as shown in FIGS. 10-11, and aligned within a frame 180, the frame preferably including points of removeable attachment 182 to the support structure 150 of the entire system 167, thus securing the frame 180 with the oxidation catalyst(s) 176 above the heater array 170. The hot drafted air may contain small amounts of carbon monoxide which is destroyed by allowing the drafted air to pass through the oxidation catalyst 176 (preferably a large cell honeycomb catalyst array placed at the exhaust outlet of the system 167). The oxidation catalyst 176 may also be utilized for the removal of chlorinated organic compounds. The oxidation catalyst 176 typically contains one or more of a group of precious metals such as platinum, palladium, and rhodium. In some embodiments, the oxidation catalyst 176 also includes an optional washcoat over a ceramic or metal substrate. The washcoat can be any suitable refractory material, including, as some examples, alumina, silica, ceria, or zirconia. In certain optimal embodiments, the oxidation catalyst 176 contains between 2-60 g/ft$^3$ of precious metal with a washcoat over a ceramic or metal substrate having between 10 to 400 cpsi.

Still other embodiments will become readily apparent to those skilled in this art from reading the above-cited detailed description in view of all the drawings. It is noted that the simplified diagrams do not illustrate all the various connections and assemblies of the various components, however, those skilled in the art wilt understand how to implement such connections and assemblies, based on the illustrated components, figures, and descriptions provided herein.

While the present general inventive concept has been illustrated by description of some embodiments, and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

It is also noted that numerous variations, modifications, and additional embodiments are possible, and, accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Accordingly, while the present general inventive concept has been illustrated by description of several embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A system for destroying fugitive organic vapor emissions, said system comprising:
   at least two catalytic flameless heater combustors, the first of said at least-two catalytic flameless heater combustors having a front, a back, a top, and a bottom, the second of said at least two catalytic flameless heater combustors having a front, a back, a top, and a bottom, said at least two catalytic flameless heater combustors being removeably affixed so as to have said front of said first of said at least two catalytic flameless heater combustors facing said front of said second of said at least two catalytic flameless heater combustors at a distance ranging from about 1 inch to about 12 inches.

2. The system of claim 1 further comprising a heat absorber inserted between said front of said first of said at least two catalytic flameless heater combustors facing said front of said second of said at least two catalytic flameless heater combustors.

3. The system of claim 1 wherein each of said at least two catalytic flameless heater combustors comprises a high surface area fibrous pad coated with a precious metal.

4. The system of claim 3 wherein the high surface area fibrous pad coated with a precious metal comprises a minimum surface area of 20 square meters per gram and a maximum surface area of 300 square meters per gram.

5. The system of claim 1 further comprising at least one additional catalytic oxidizer removeably affixed above said top of said first of said at least two catalytic flameless heater combustors and also above said top of said second of said at least two catalytic flameless heater combustors to provide for oxidation of any stray organics that escape oxidation by either of said at least two catalytic flameless heater combustors.

6. The system of claim 2 wherein said heat absorber comprises a honeycomb catalyst that is coated with a high temperature infrared absorbing coating to absorb radiant heat.

7. The system of claim 2 wherein said heat absorber comprises a honeycomb catalyst that contains a precious metal and a washcoat coated on a substrate.

8. The system of claim 1 further comprising at least one manifold for feeding gases into said at least two catalytic flameless heater combustors.

9. A system for destroying gaseous fugitive emissions by catalytic oxidation comprising:
 a. a vertically oriented first catalytic heater comprising a first catalyst chamber;
 b. a vertically oriented second catalytic heater comprising a second catalyst chamber, the second catalytic heater facing the first catalytic heater; and
 c. a manifold connected to the first catalytic heater and the second catalytic heater, the manifold configured with tubing for directing fuel gas and fugitive emissions to the first catalyst chamber and the second catalyst chamber, wherein the distance between the first catalytic heater and the second catalytic heater ranges from about 1 inch to about 12 inches.

10. The system of claim 9 wherein a top distance between the top of the first catalytic heater and the top of the second catalytic heater is shorter than a bottom distance between the bottom of the first catalytic heater and the bottom of the second catalytic heater.

11. The system of claim 9 further comprising an ignition device proximate to the first catalyst chamber and the second catalyst chamber for starting catalyst oxidation in the first catalyst chamber and the second catalyst chamber.

12. The system of claim 9 wherein the difference between the top distance and the bottom distance comprises up to about 4 inches.

13. The system of claim 9 further comprising a pressure regulator for regulating the pressure of the fuel gas and wherein the manifold further comprises a precision orifice through which the fuel gas flows to control the feeding of the fuel gas to the first catalyst chamber and the second catalyst chamber.

14. The system of claim 9 further comprising:
 a. a first input tube forming part of the manifold; and
 b. a first valve located along the first input tube wherein the setting of the first valve determines the amount of fuel gas sent to the first catalyst chamber and the second catalyst chamber.

15. The system of claim 14 further comprising:
 a. a first flowmeter located along a fugitive gas feed inlet wherein the fugitive gas feed inlet forms part of the manifold and through which fugitive gas is delivered to the first catalyst chamber and the second catalyst chamber; and
 b. an electronic controller in communication with the first flowmeter wherein the electronic controller controls the setting of the first valve to reduce flow of the fuel gas if fugitive emissions are above an upper threshold or increase flow of the fuel gas if fugitive emissions are below a lower threshold.

16. The system of claim 9 wherein the ignition device further comprises an electric tubular heater in contact a catalyst pad in either the first catalytic heater or the second catalytic heater.

17. The system of claim 9 wherein the manifold further comprises tubing through which an ignition gas is delivered to the first catalyst chamber and the second catalyst chamber.

18. The system of claim 9 wherein the manifold further comprises a first valve along a first tube used for delivering fugitive emissions to the first catalyst chamber and the second catalyst chamber, and a second valve along a second tube used for delivering hydrogen gas to the first catalyst chamber and the second catalyst chamber.

19. The system of claim 9 wherein the manifold is sized and shaped to deliver a mixture of fuel gas and fugitive emissions to the first catalytic heater and the second catalytic heater in substantially equal amounts.

20. The system of claim 9 wherein each of the first catalytic heater and the second catalytic heater comprises:
 a. a metal box including five walls including four side walls and one back wall;
 b. an empty space defined by the metal box;
 c. a perforated metal sheet cut to the size of the metal box;
 d. a low density ceramic wool pad cut to the size of the metal box, wherein the metal sheet serves as a support for the ceramic wool pad;
 e. a catalyst pad cut to the size of the metal box, wherein the ceramic wool pad serves to separate the perforated metal sheet from the catalyst pad;
 f. a lid for holding the catalyst pad attached to the metal box; and
 g. an aperture in the back wall of the metal box where the manifold is attached to the metal box for providing gas to the catalyst pad.

21. The system of claim 9 wherein the manifold further comprises:
 a. a first input for the introduction of fuel gas to the system;
 b. a second input for introduction of fugitive emissions to the system; and
 c. a third input for introducing an ignition gas to the system.

22. The system of claim 9 further comprising a radiant heat absorbing material positioned between the first catalytic heater and the second catalytic heater to absorb infrared radiation from the first catalytic heater and the second catalytic heater so that heat can be transferred by convection to air drafted between the first catalytic heater and the second catalytic heater.

23. The system of claim 9 further comprising an oxidation catalyst positioned above the first catalytic heater and the second catalytic heater for polishing exhaust from the first catalytic heater and the second catalytic heater and oxidizing any ambient contaminants which might be in the air being drafted up proximate to the oxidation catalyst.

24. The system of claim 22 wherein the radiant heat absorbing material comprises a high temperature radiant absorbing outer coating.

25. The system of claim 22 wherein the radiant heat absorbing material comprises a sheet comprising apertures arranged in an array wherein the area of the apertures comprises from about 20% to about 70% of the total area of the sheet.

26. The system of claim 22 wherein the radiant heat absorbing material comprises a metal tube formed into a serpentine shape for the flow of a heat exchange fluid through the metal tube.

27. The system of claim 23 wherein the oxidation catalyst comprises between about 20 and about 50 cells per square inch of entry surface.

28. The system of claim 27 wherein the oxidation catalyst is coated with an aluminum oxide coating, such coating further comprising precious metal impregnated therein.

29. The system of claim 28 wherein the precious metal comprises a metal selected from the group consisting of platinum, palladium, rhodium and combinations thereof.

30. The system of claim 9 wherein the first catalytic heater further comprises an array of a plurality of first catalytic heaters and wherein the second catalytic heater further comprises an array of a plurality of second catalytic heaters.

31. The system of claim 15 further comprising a second flowmeter located along a first input tube wherein the first input tube forms part of the manifold and through which fuel gas is delivered to the system, and wherein the second flowmeter is in communication with the electronic controller to provide data to the electronic controller regarding how much fuel gas is passing through the first input tube at any given time.

* * * * *